United States Patent
Tietzen et al.

(10) Patent No.: US 11,367,097 B2
(45) Date of Patent: Jun. 21, 2022

(54) SYSTEMS AND METHODS FOR TRANSACTION VERIFICATION

(71) Applicant: Edatanetworks, Inc., Calgary (CA)

(72) Inventors: Terrance Patrick Tietzen, Edmonton (CA); Matthew Arnold Macpherson Bates, Beaumont (CA); Ronald Rog, Edmonton (CA)

(*) Notice: Subject to any disclaimer, the term of this patent is extended or adjusted under 35 U.S.C. 154(b) by 51 days.

(21) Appl. No.: 17/087,028

(22) Filed: Nov. 2, 2020

(65) Prior Publication Data

US 2021/0049636 A1  Feb. 18, 2021

Related U.S. Application Data

(63) Continuation of application No. 14/554,907, filed on Nov. 26, 2014, now Pat. No. 10,861,040.

(60) Provisional application No. 61/909,105, filed on Nov. 26, 2013.

(51) Int. Cl.
*G06Q 30/02* (2012.01)

(52) U.S. Cl.
CPC ..... *G06Q 30/0225* (2013.01); *G06Q 30/0226* (2013.01); *G06Q 30/0248* (2013.01)

(58) Field of Classification Search
CPC ........... G06Q 30/0225; G06Q 30/0226; G06Q 30/0248
See application file for complete search history.

(56) References Cited

U.S. PATENT DOCUMENTS

| | | | |
|---|---|---|---|
| 2010/0057550 A1* | 3/2010 | Nguyen | G06Q 30/02 705/14.35 |
| 2012/0296716 A1* | 11/2012 | Barbeau | G06Q 30/02 705/14.1 |
| 2013/0275197 A1* | 10/2013 | Thibedeau | G06Q 20/202 705/14.26 |

* cited by examiner

*Primary Examiner* — Scott C Anderson
(74) *Attorney, Agent, or Firm* — DeSandro Law Group PLLC; Bradley K. DeSandro

(57) ABSTRACT

Methods, systems and device for verifying a transaction in a loyalty or advertising system are described. One such method includes: receiving, at least one processor, transaction data associated with a transaction between a customer and a merchant; determining, at the at least one processor, from the transaction data whether the customer and the merchant are associated with the loyalty or advertising system; and upon determining from the transaction data whether the transaction corresponds to a reward or advertisement, triggering the redemption of the reward or advertisement.

20 Claims, 8 Drawing Sheets

SYSTEMS AND METHODS FOR TRANSACTION VERIFICATION

CROSS-REFERENCE TO RELATED APPLICATION

This application claims the benefit of U.S. patent application Ser. No. 14/554,907, filed on Nov. 26, 2014, and U.S. Provisional Application No. 61/909,105, filed Nov. 26, 2013, both of which are incorporated herein by reference.

FIELD

The embodiments described herein relate to systems and methods for transaction verification, and in particular, to systems and methods for transaction verification for systems separate from the financial transaction system.

BACKGROUND

Financial transactions, such as transactions between merchants and customers, are increasingly conducted electronically through online systems or point-of-sale (POS) terminals.

Since these transactions are commonly tightly controlled by financial institutions or payment processors, external systems such as loyalty or sales tracking systems often manage their own transactions independently from and parallel to the transaction systems operated by the financial institutions/payment processors.

SUMMARY

In accordance with one aspect, there is provided a method for verifying a transaction in a loyalty or advertising system. The method includes: receiving, at least one processor, transaction data associated with a transaction between a customer and a merchant; determining, at the at least one processor, from the transaction data whether the customer and the merchant are associated with the loyalty or advertising system; and upon determining from the transaction data whether the transaction corresponds to a reward or advertisement, triggering the redemption of the reward or advertisement.

In accordance with another aspect, there is provided a loyalty program device comprising at least one processor. The at least one processor is configured to: receive transaction data associated with a transaction between a customer and a merchant; determine, at the at least one processor, from the transaction data whether the customer and the merchant are associated with the loyalty or advertising system; and upon determining from the transaction data whether the transaction corresponds to a reward or advertisement, trigger the redemption of the reward or advertisement.

In accordance with another aspect, there is provided a non-transitory, computer readable medium or media having stored thereon computer readable instructions. The instructions, when executed by at least one processor, configure the at least one processor to: receive transaction data associated with a transaction between a customer and a merchant; determine, at the at least one processor, from the transaction data whether the customer and the merchant are associated with the loyalty or advertising system; and upon determining from the transaction data whether the transaction corresponds to a reward or advertisement, trigger the redemption of the reward or advertisement.

DRAWINGS

Figure 1:
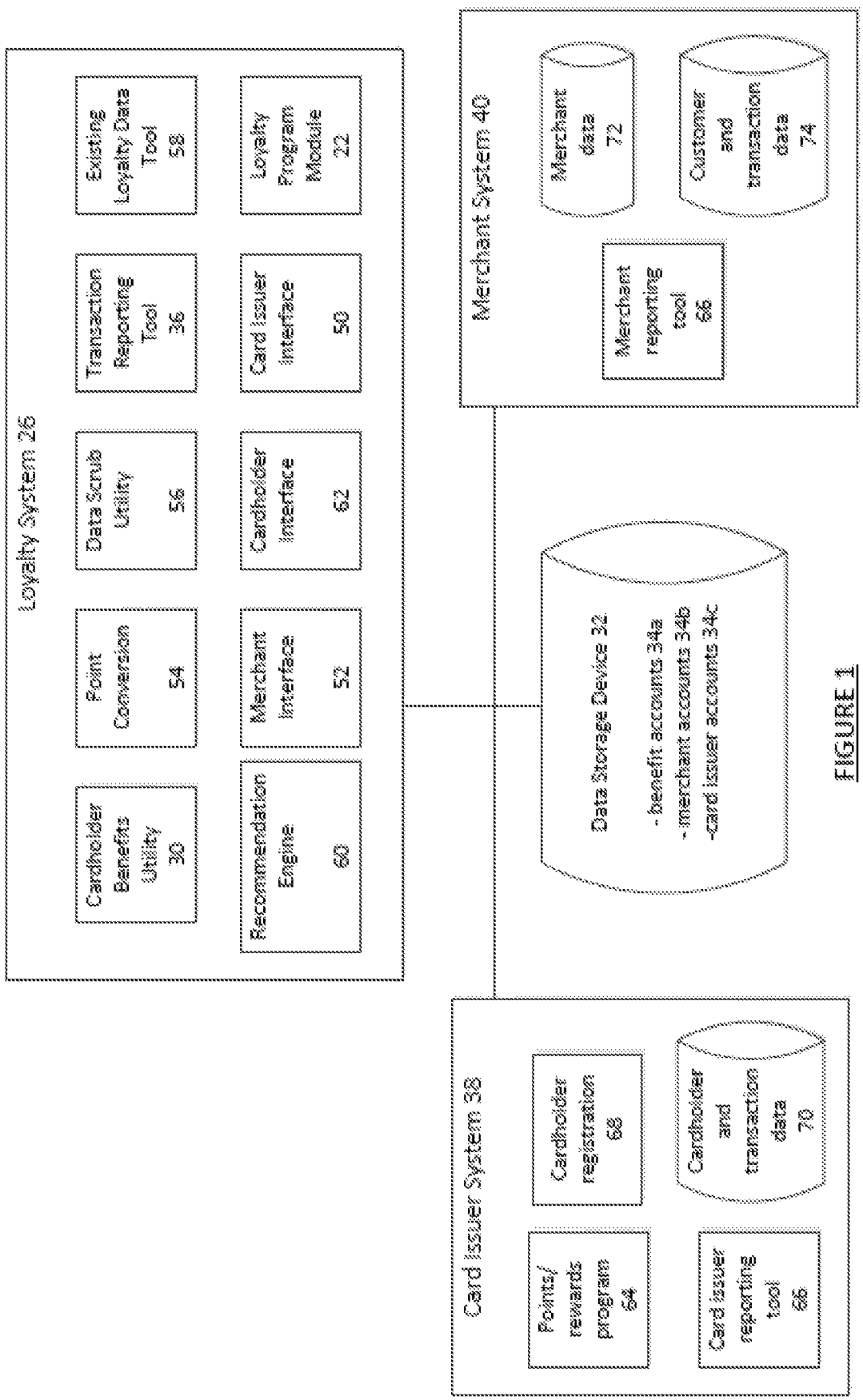
Figure 2:
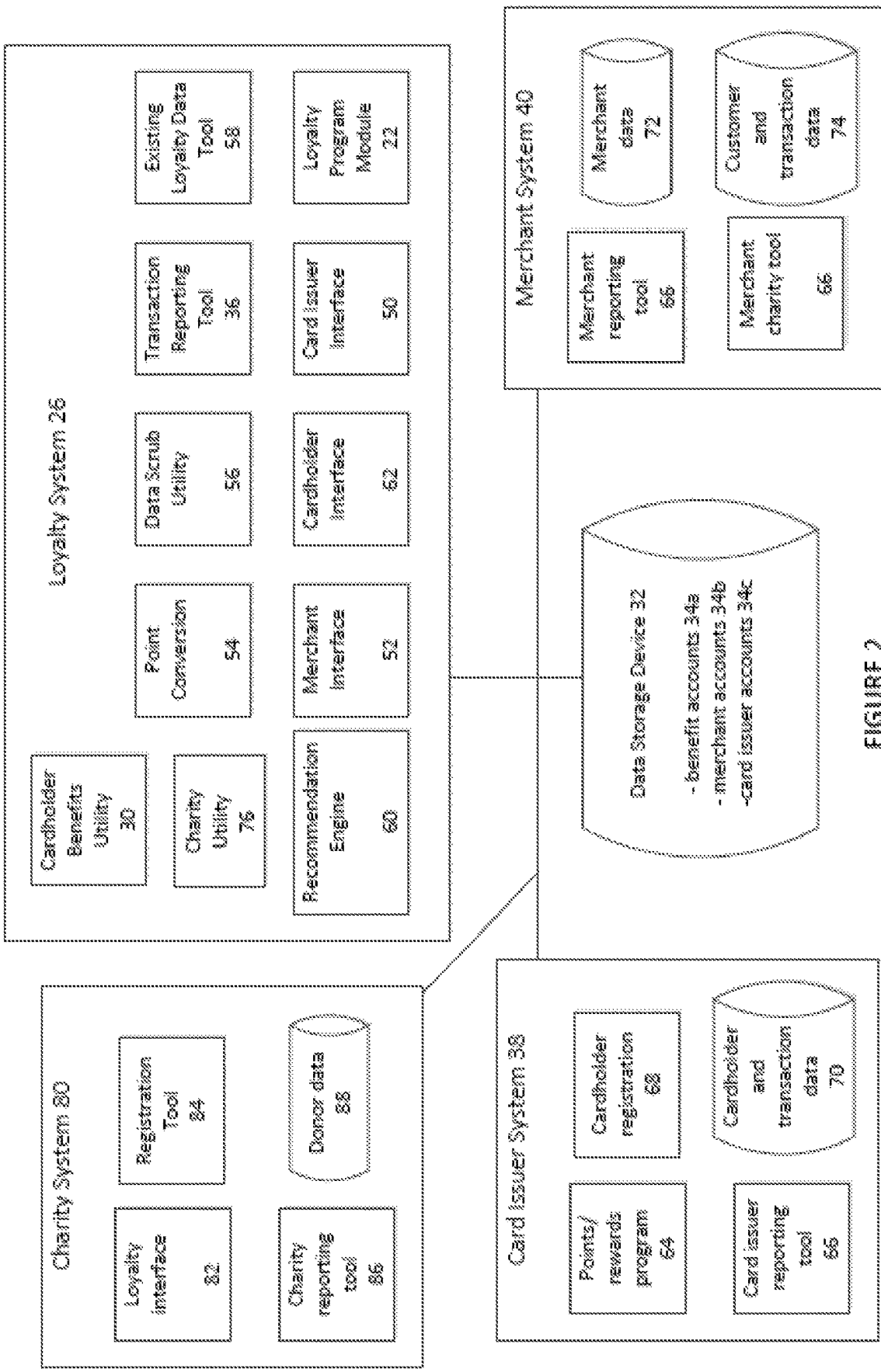

Various embodiments will now be described, by way of example only, with reference to the following drawings, in which:

FIGS. 1 and 2 provide schematic diagrams of example loyalty systems in accordance with example embodiments; and FIGS. 3-8 provide flowchart diagrams of example methods for loyalty systems in accordance with example embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

DESCRIPTION OF VARIOUS EMBODIMENTS

In common loyalty programs, merchants often require software and/or hardware systems installed on-location for managing loyalty rewards. In addition to processing a financial transaction with a traditional credit, debit or other payment method, these loyalty systems may require a merchant to scan a customer's loyalty card. In this manner, the financial transaction can be linked to the customer. However, in many cases, these standalone loyalty systems can be costly and time-consuming, which may discourage or prohibit the participation of small to medium-sized business.

In some examples, the systems and methods described herein may be implemented with little or no additional hardware or software installation by a merchant. In accordance with aspects of the present disclosure, some example embodiments described herein relate generally to the verification or matching of transactions processed through financial institutions or payment processor systems with loyalty or advertisement verification systems.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The term "merchant" may refer to an entity who participates in a loyalty program to build loyalty with customers, and potentially acquire new business, and in exchange is willing to provide a loyalty "benefit", which may include the various types of benefits that may be associated with loyalty cards including points, whether convertible to financial rewards, or financial rewards convertible to points, cash, products, services, discounts, value add-ons for purchases of products or services, the opportunity to enter into a contest with prizes contributed by the merchants, financial institutions and/or the loyalty system operator. Merchants may offer goods and/or services for purchase by a customer including members of the loyalty system.

A "member" may refer to the customer or potential customer who is a member of the loyalty program.

A "card issuer" may refer to an entity that issues (directly or through an agent) financial cards to individuals or businesses. The card issuer is generally a financial institution, financial institution in association with a credit card company, or other entity that has a financial institution arm. "Financial cards" may generally refer to credit cards, debit cards, INTERAC cards, stored value cards and so on.

"Cardholders" may refer to the individuals or businesses to whom the financial cards are issued. "Loyalty" may be used in the broad sense to also extend to "rewards", therefore a "loyalty program" may also extend to a "reward program".

Customer acquisition systems may play an increasingly important role for business. Customer loyalty programs can contribute to the loyalty of existing customers, but also can play a role in acquiring new customers.

The businesses of the various card issuers may vary significantly. Financial cards are generally issued by or issued in cooperation with financial institutions. For example: (1) financial institutions (including a financial institution associated with a source of benefits) issue financial cards directly to customers; and (2) a co-branded financial card including for example the brand of the financial institution and the brand of a source of benefits.

Financial institutions are often interested in partnering with other entities, such as sources of benefits, to make the benefits associated with their financial card competitive. This may be done in order to retain and attract their customers, but also in order to compete for transaction share as cardholders generally carry more than one financial card in their wallet. Transaction share in turn affects the revenue realized by the financial institution. Accordingly, financial institutions tend to measure the effectiveness of their marketing efforts in connection with financial cards by analyzing incremental transactions involving their financial card.

In addition, financial institutions are generally interested in sharing profit/risk with other parties in connection with their financial card related activities. This is evidenced in the popularity of co-branded cards. Generally speaking, however, card issuers are only interested in providing access to their customer base to outside parties if there is significant financial reward, and if this access does not conflict with their own interests and/or present any risk to the customer base.

Merchants provide benefits to their customers for reasons that are not dissimilar to the factors that motivate financial institutions. Merchants are interested in attracting and maintaining customers. The cost of acquisition of a new customer for many merchants is quite high. While merchants are interested in acquiring new customers efficiently, they are often also willing to provide relatively significant benefits in exchange for a new customer relationship from an outside source.

Merchants and financial institutions often collaborate in the context of co-branded financial cards. Examples include airline/credit cards, oil company financial cards, or retail chain financial cards. From a merchant perspective, these collaborative arrangements are generally available to large national chains and are not generally available to regional chains or small businesses, even though from a customer acquisition or benefits perspective such regional chains or small businesses might be of interest to a financial institution.

The costs associated with deploying and marketing a co-branded card require economies of scale that effectively exclude many regional or small business co-branded financial card arrangements. From the perspective of a financial institution, the benefits associated with the co-branded financial cards are generally limited to the type of benefits made available by a merchant or a relatively small group of associated partners. This exposes the financial institution to competition to other co-branded financial cards, especially if the merchant associated with the competing card is more popular or makes better benefits available. Also, relationships with merchants become difficult or cumbersome to replace (especially over time) thereby resulting in loss of bargaining power in the hands of the financial institution and thereby possible erosion of benefits. This contributes risk to the financial institution's card issuing operation, and also generally results in financial institutions entering into multiple co-branding relationships, which in turn adds to the associated costs.

The extent to which merchants are willing to provide benefits, incentives, and rewards to cardholders in the context of a loyalty program is enhanced if means are provided to enable merchants to verify the commercial benefit derived by the merchants, and means are provided to tailor the benefits to particular cardholders based on cardholder preferences, spending habits, and the like. Benefits to cardholders may be increased, with resulting benefits to card issuers, if the merchants are given in accordance with embodiments described herein the tools to measure and monitor the effectiveness and incremental cost of their activities involving benefits to cardholders. There is a need for a method, system and computer program that enables merchants to monitor and verify the commercial benefit that they are deriving from benefits being provided to cardholders who are members of the a loyalty program, thereby encouraging the merchants to increase the level of benefits that they provide.

The framework for an example loyalty system will now be described. A loyalty program may be linked to one or more card issuers, where financial and/or loyalty cards are provided to members of the loyalty program, referred to as cardholders. The loyalty card may refer to a physical card with an electronic device thereon, an electronic account associated with a member, and the like. The loyalty system is operable to enable the creation, implementation and management of one or more loyalty programs that provide benefits to members of the loyalty programs (e.g. cardholders) in connection with transactions between the members and one or more merchants associated with the loyalty system. One or more card issuers may register on the loyalty system. The operator of the loyalty system, the one or more card issuers, and the merchants may establish the rules for accrual and processing of benefits or incentives from the merchants to cardholders associated with the one or more card issuers in connection with transactions between the cardholders and the merchants with the loyalty system. One or more merchant acquirers register on the loyalty system associated with the one or more card issuers. Cardholders are registered as members of the loyalty program. Incentives may be defined by rules to accrue and process the benefits of cardholders in connection with the transactions between the cardholders and the merchants by operation of the loyalty system.

The loyalty system may increase transactions for the merchant by way of incentives, and may enable card issuers and merchants to share the risk and costs associated with directing loyalty programs to cardholders. The loyalty system may connect to systems associated with the card issuers and one or more associated merchant acquirers. On this basis, merchants may direct the loyalty programs or aspects thereof to specific cardholders based on BIN ranges, and based on geographic, transaction histories, demographics, and/or time based parameters.

A loyalty program may be linked to one or more card issuers, and thereby to their cardholders, by operation of a loyalty program platform or loyalty engine or loyalty system. Merchants associated with the loyalty system are provided with tools to customize one or more loyalty programs made available to cardholders or members of the loyalty program platform (customers and potential customers of the merchants).

The operator of the loyalty program platform may establish the rules regarding the accrual of benefits from merchants to the card issuers and/or cardholders, and establish a contractual relationship with the one or more card issuers, such contracts incorporating the rules applicable within the loyalty system in connection with the card issuers (as well as their cardholders). These rules include, for example, the term of the agreement, accrual periods, geographic area of operation (if applicable) and most importantly the particulars of the benefits or incentives (including per transaction benefits, convertibility of benefits, accrual periods, timing of obligation regarding realization of benefits etc.) accrued to cardholders and/or card issuers. These rules may be reinforced in the arrangements entered into between the operator of the loyalty system and the various merchants so as to define the terms under which benefits will be made available to cardholders and/or card issuers.

The operator of the loyalty system may establish independently the rules under which the merchant shall accrue benefits for cardholders and/or card issuers, generally independently of card issuer but in conformity with the arrangements entered between the operator of the loyalty system and the card issuer. The operator of the loyalty system may manage the aforesaid relationships, and provide access to a technology infrastructure that enables card issuers and merchants to focus on using the tools of the loyalty system to enhance their business, rather than spending extensive resources on administrative issues.

Typically, the merchants may agree to conform to commitments that they make to members that are displayed in a benefits area of a website associated with the members who are cardholders, and linked to the loyalty system. These commitments are generally made by merchants in connection with the customization of their loyalty programs by operation of the loyalty engine.

The merchant acquirer register on the loyalty system, if the merchant acquirer is not already registered. The cardholders are registered as members on the loyalty system. This occurs in part as a result of promotion of the loyalty system to the cardholders by the card issuer, or by the merchant. In addition to the card issuer, in most cases there is also a "merchant acquirer", who is an entity that contracts with a merchant to process financial card transaction information, and that may receive unique data not received by the card issuer.

The loyalty system applies the aforementioned rules as they apply to each cardholder who is a member so as to process the applicable benefits or incentives based on applicable transactions entered into by the cardholder that are linked to the loyalty system, i.e. a qualifying transaction between a cardholder and a merchant, as determined by the aforesaid rules for the incentives. By application of such rules, the loyalty system processes the agreed to benefits for the cardholder and/or the card issuer. The processed incentive may be referred to as redemption.

Referring now to FIG. 1, there is shown a loyalty system 26 interacting with a card issuer system 38 and a merchant system 40.

Loyalty system 26 may be implemented using a server and data storage devices 32 configured with database(s) or file system(s), or using multiple servers or groups of servers distributed over a wide geographic area and connected via a network. Loyalty system 26 may be connected to a data storage device 32 directly or via to a cloud based data storage device interface via network. Loyalty system 26 may reside on any networked computing device including a processor and memory, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. Loyalty system 26 may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. Loyalty system 26 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Loyalty system 26 may include one or more input devices, such as a keyboard, mouse, camera, touch screen and a microphone, and may also include one or more output devices such as a display screen and a speaker. Loyalty system 26 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one loyalty system 26 is shown for clarity, there may be multiple loyalty systems 26 or groups of loyalty systems 26 distributed over a wide geographic area and connected via e.g. network. Loyalty system 26 may be connected to the Internet or other network in order to interact and connect with card issuer system 38 and merchant acquirer system 40.

Loyalty system 26 includes a cardholder benefits (e.g. incentives) processing utility 30. In one example of an implementation, the cardholder benefits processing utility 30 may be a software component of a web utility that provides a loyalty engine. Accordingly, cardholder benefits processing utility 30 may be referred to as a loyalty engine. The cardholder benefits processing utility 30 may be programmed to configure the data storage device database 32 with benefits accounts 34*a* of the various cardholders who are members.

The loyalty system 26 may be programmed to configure the data storage device 32 with merchant accounts 34*b* of the various merchants who are registered with loyalty system 26 to provide loyalty programs and offer incentives or benefits.

The loyalty system 26 may be programmed to configure the data storage device database 32 with card issuer accounts 34*c* of the various card issuers who are registered with loyalty system 26 to provide loyalty cards to cardholders for loyalty programs.

Access to different aspects and account records of the data storage device 32 may provided by an administration utility (not shown) that enables hierarchical access to the data storage device 32, depending on permissions assigned by the operator of the loyalty system, to each of members, merchants, card issuers and merchant acquirers. The purpose of providing this access is to provide transparency to the benefits being provided to members who are cardholders by operation of the loyalty system 26.

Loyalty system 26 further includes a reporting utility or transaction data reporting 36, which may be further linked to the cardholder benefits processing utility 30 and data storage device 32 to provide various reports of interest to merchants, merchant acquirers, card issuers and cardholders. For example, transaction data reporting 36 may permit merchants, merchant acquirers and card issuers to generate reports on measured performance of benefits or incentives provided to them by the loyalty system 26 in their sphere of interest. One of the purposes of the reporting utility 36 is to enable the organizations linked to the loyalty system 26 to calibrate their involvement (e.g. by merchants or card issuers calibrating the benefits that they provide) targeted to cardholders, and to review the results of their loyalty programs management by loyalty system 26.

Loyalty system 26 may include program module 22 which may be a hardware and software tool to manage the various loyalty programs managed by loyalty system 26. Loyalty programs may be particular to one or more card issuers or merchants, or a combination thereof.

In example embodiments described herein, card issuer system 38 is provided with tools to design and implement their own loyalty programs, including cross-promotional programs in conjunction with merchants. The card issuer system 38 may design and implement loyalty programs specific to a particular card issuer using card issuer interface 50.

In example embodiments described herein, merchant system 40 is provided with tools to design and implement their own loyalty programs, view reports regarding their loyalty programs, design and implement their own benefits or incentives, including cross-promotional programs and benefits in conjunction with card issuers. The merchant system 40 may design and implement loyalty programs and incentives using merchant interface 52.

Loyalty system 26 may be operable with any financial card that permits tracking of transaction information through card processing systems. Financial cards such as credit cards, debit cards, INTERAC cards, stored value cards, may be designated by a BIN number range. The BIN range identifies the financial card type and the issuing financial institution (e.g. card issuers). Card issuers typically market card types to certain segments of the population based upon demographic data such as credit scores, income, age, location, and anticipated card use. Because of this the BIN range may also represent a market or demographic segment of cardholders. For example, co-branded business travel cards may be marketed towards persons and organizations that typically utilize the specialized features of a travel card, such as points for travel and/or specialized services (e.g. travel insurance, lost baggage coverage) to facilitate needs and wants of persons who travel regularly. Another card, such as a TOYS R US card, for example, may be provided to young families. Each financial card therefore may be used to target particular consumer needs. The unique BIN range associated with each financial card may enable the use of a particular financial card to be identified within the loyalty system (below). This in turn enables merchants to target particular groups of members based on demographic data extrapolated from the financial card that they are using (by operation of the BIN range associated with their card), or more particularly demographic data associated with a sub-set of cardholders using a particular financial card, possibly as communicated by the card issuer. As will be described herein, loyalty system 26 may recommend incentives tailored to segments of customers, where the recommendation may be based on BIN range and other attributes of customers, such as spending habits, interests, needs, wants, charities, social habits, etc.

Embodiment described herein may utilize the BIN range of co-branded cards to develop additional transactions and associated incentives to selected groups of card holders and promote the use of certain financial cards for the transactions for the benefit of: cardholders, merchants, financial card issuers and merchant acquirers.

In accordance with the embodiments described herein, a card issuer system 38 and thereby one or more of its cardholders, are linked to the loyalty system 26. The loyalty programs provided by this loyalty system 26 may run in parallel with other loyalty and rewards programs. In accordance with embodiments described herein, costs of implementation may be very low for card issuer system 38 as it may interface with loyalty system 26 to access loyalty engine 30, etc. The loyalty system 26 is operable, via the Internet for example, to engage in real time data communications with a card issuer system 38 and/or a merchant system 40. Accordingly, seamless data flows between these systems can be established in order to enable the capture of financial transactions and cardholder data, and also the accrual of benefits or incentives based on data provided to the loyalty system 26 by each of the card issuer system 38 and the merchant acquirer system 40.

Loyalty system 26 is not only a loyalty system used by merchants but also becomes a secondary loyalty system for the card issuer for its cardholders. Loyalty system 26 is operable to provide system tools for the card issuer to receive payments from the merchants in connection with transactions between the merchants and the cardholders of the card issuer who are registered with the loyalty system 26. The card issuer may receive payment from the merchants indirectly through interchange fees collected by a merchant acquirer from the merchants at the time a transaction is processed on a financial card. In this particular embodiment the card issuer can receive payments and/or points from loyalty system merchants for transactions made by cardholders.

The card issuer may propose to encourage a specific demographic (as defined by a BIN range) to join the loyalty program by tailoring benefits and incentives to the specific segment of cardholders. Loyalty system 26 may recommend incentives based on attributes of the segment of cardholders. The merchants in the loyalty system 26 may agree to provide additional payments to the card issuer in the form of points or cash for transactions between merchants and cardholders of a selected BIN range (e.g. targeted segment) that have registered their financial card with the loyalty system 26 or opted in to the applicable loyalty program. By operation of the loyalty system 26, merchants may have the ability to vary the amount or the percentage of the transaction accrued and paid to the card issuer, or some other aspect of the benefit provided. The payment may be in the form of cash or redeemable points. The loyalty system 26 is operable to calculate the amount accrued to be paid to the card issuer for each cardholder who is a member by each merchant. The reporting facility provides visibility to the card issuer and the merchant in regard to the amounts accrued and subsequently paid at the end of the measurement period.

The amounts transferred to the card issuer may be redistributed by the card issuer to the cardholders in the form of extra points for transactions completed or the card issuer may retain a percentage of the amount transferred, for example, as an administration fee. In other words, the amounts transferred can then be accrued and distributed in accordance with the card issuer's own rules therefore.

In some circumstances the card issuer and the merchants of the loyalty system 26 may choose to offer special offers/prizes (e.g. incentives) through the merchants and the loyalty system 26. The card issuer and the loyalty system pre-determine the conditions under which this occurs. Typically, the incentives are associated with conditional transactions with merchants (e.g. the purchase of a particular good or service is required in order to receive the special offer or prize). This encourages cardholders to conduct transactions with merchants. When a registered cardholder enters into such a transaction with a merchant in connection with the loyalty system 26, an amount owed by the card issuer to the merchant is recorded. At the end of the reporting period the system aggregates the amounts owed to merchants by the card issuer and settlement is made and then reimbursement funds are distributed to the respective merchants.

Loyalty system 26 may result in more transactions on the particular registered financial card of the card issuer, more individuals/businesses owning and using a financial card with a particular BIN range(s) and distribution of the cost of incentives provided to the customer by the card issuer and the merchant within the loyalty system 26. The amounts owed the merchants or to cardholder/card issuer are tracked within the loyalty system for the accounting period. Further, loyalty system 26 may recommend incentives particularly tailored to targeted segments of cardholders and potentially cardholders to further increase particular transactions. The recommended incentives and associated transactions are likely to be of interest to the targeted segment based on data mining and correlations of cardholder (and potential customer and cardholder) attributes.

The end result may be the accrual of benefits and incentives the to the benefits account 34, which then in is disbursed on a periodic basis to the applicable card issuers.

The operator of the loyalty system may enter into a contract with a financial institution that has a plurality of co-branded cards and seeks new customer base potential through the financial institution's co-branded card partners that have an interest in increasing transactions on their co-branded card by attracting merchants. In this case, it may be a business limitation that products and services associated with the loyalty program for the most part will not compete with the co-branded partner's business, i.e. that the businesses involved be complementary. The financial institution contacts and motivates its customer base (cardholders) to join the loyalty program and thereby provide the loyalty system 26 with a stream of new members. As stated earlier, the members joining the loyalty system through this referral source are associated with their co-branded card(s) within the loyalty system 26, each co-branded card being identified by different BIN number ranges and thereby historical demographics, credit score ranges and preferences associated with the particular card. Cardholders may individually join the loyalty program and register their card.

The loyalty system 26 may use the BIN number range and any associated demographic and credit score, along with geography and any customer preferences (e.g. cardholder attributes) to recommend special offers for loyalty programs of merchants to the individual cardholders (for example: unique product/service offerings to specifically tailored to customers). The loyalty system 26 is operable when a member with a co-branded card that is within a suitable BIN number range enters into a transaction with a merchant to record the applicable transaction information as cardholder attributes, aggregate said transaction information, and supply measured results to both the merchant and the card issuer.

Typically there is comity of interest between the merchants and the card issuers, in that merchants will be willing to provide the greatest incentives to the cardholders that the card issuers are most interested in providing incentives to. Accordingly, from a card issuer perspective, loyalty system 26 provides an efficient mechanism for maximizing benefits being provided to their preferred customers by having them register with a loyalty program where merchants, in the interest of promoting their own products/services, will automatically provide optimal benefits to these preferred customers.

For example, a new member, joining through a cobranded card reference, transacts with the registered financial card, and in the embodiment where the merchant and/or the co-branded issuer supply the additional benefit (which, typically being supplied through the normal co-branded card channels, consists of points, discounts or cash back). The amount paid by the merchant is usually based upon on one or more of the following: (1) the amount of the transaction; (2) the value of the transaction; and/or (3) the value of the transaction less an amount that was set as a pre-condition.

The card issuers may benefit financially from the transactions involving their financial cards in numerous ways: (1) cardholders carrying credit card balances; (2) maintaining customers using the incentives and selling other products/services to such customers; (3) acquiring new customers for such products/services using incentives; (4) financial incentives provided to financial institutions in exchange for promotional access to their customers; (5) interchange fees associated with transactions involving the financial cards; (6) yearly card fees; (7) transaction fees charged to the cardholder (if applicable); (8) currency exchange fees; (9) fees payable to the card issuer by merchants (generally tied to BIN ranges); (10) augmentation of card issuer's loyalty program (reduction of costs associated with card issuer's loyalty program, i.e. replacement of card issuer paid benefits with merchant paid benefits; and (11) revenue from merchant acquirer for additional transactions involving the merchant and the merchant acquirer; (12) customer tailored incentives through recommendation engine.

The merchant acquirer may receive the benefits of: (1) additional merchants who join their processing system to increase their access to a BIN range of cardholders; (2) additional revenue from merchants (participation fees); (3) increased revenue from additional merchant transactions; (4) ability to differentiate over other merchant acquirers based on the ability to provide access to the loyalty system. Merchant system 40 may also refer to a merchant acquirer system 40.

Loyalty system 26 provides for a linkage of a data between the merchant systems 40 and card issuers systems 38, and thereby their cardholders, facilitated through the loyalty system 26 technology that enables a card issuer to include its cardholders in a secondary loyalty system that supplements any card issuer point system. Although only one card issuer system 38 is shown in FIG. 1 for simplicity, there may be multiple card issuer systems 38 connected to loyalty system 26. Although only one merchant system 40 (or merchant acquirer system 40) is shown in FIG. 1 for simplicity, there may be multiple merchant systems 40 connected to loyalty system 26.

Loyalty and customer acquisition programs may be required to continually acquire new members, preferably at a low cost, e.g. through organic growth or through a partnership with various customer sources, including card issuers. Card issuer system 38 may retain cardholder databases of transaction information and other cardholder benefits, which may include data from other loyalty program operators and with participating merchants. Loyalty system 26 may access the cardholder databases to detect cardholder attributes in order to recommend incentives.

In the card transaction process, the card issuer generally has access to the following transaction information: (1) cardholder name; (2) card number; (3) date of transaction; (4) merchant ID; (5) amount of purchase; and (6) BIN number. Other information may also be accessible such as demographic, geographic, and credit score information relating the cardholder. This information may be stored in cardholder databases and accessed by loyalty system 26.

Some financial institutions have both card issuing and merchant acquiring business lines and loyalty system 26 may enable the two lines to work together for common benefit. The merchant acquirers may have access to following additional information that may not be generally available to the card issuer: (1) the time of the transaction; (2) the terminal ID (within a merchant system); and (3) the fee rates charged the merchant based upon the financial card and how the financial card is used (e.g. internet transaction vs. verified signature). Loyalty system 26 may access this information (e.g. cardholder attributes) to recommend incentives.

Loyalty system 26 is operable to link the card issuer, the cardholder, the merchant acquirer and the merchants such that the loyalty system 26 is operable to match time of day data (or other common variables) of a transaction with other information provided by the card issuer to the loyalty system 26. This functionality allows merchants to offer time of day or otherwise tailored special offers (e.g. incentives) to specific cardholders who are members of the loyalty system.

Loyalty system 26 is operable to match the terminal ID information obtained from the merchant processor with the transaction information obtained from the card issuer. This allows a merchant and/or a card issuer to tailor benefits to specific geographic locations, and enables loyalty system 26 to recommend incentives for specific geographic locations and other cardholder attributes.

Loyalty system 26 enables each of the merchants, members and card issuers to track the accrual of benefits by means of financial card transactions that in connection with the loyalty system 26 result in the accrual of loyalty benefits (e.g. incentives).

Loyalty system 26 is operable to store the data items mentioned above (and other similar data items) to the data storage device 32 and apply same against transactions between participating members and participating merchants. Loyalty system 26 may use the data items to recommend incentives and corresponding transactions.

The following provides an example transaction process. A cardholder who is a member transacts with a merchant using their financial card. The merchant transaction data is then usually settled by the merchant acquirer. The member transaction data (e.g. cardholder attributes) is then preferably transmitted to the loyalty system 26. This member transaction data usually includes the data items described above. This data is then stored to the data storage device 32, which may include a relational database. The rules defined for the cardholder within the loyalty system are then applied to the merchant transaction data.

As stated earlier, an agreement is entered into between the card issuer and the operator of the loyalty system on behalf of the merchants. The agreement may extend to one or more accounting periods. The agreement generally establishes the expected relationship and flow of funds between the financial institution and the merchants based on anticipated transactions, as well as the additional incentives that will be provided to the cardholders for transactions linked to the loyalty system and who will be the party covering the costs of such additional incentives and how. The agreement generally covers group of financial cards, identified by a BIN range. Also as stated earlier, cardholders are encouraged by the card issuer to join the loyalty program for additional cash rewards, points and/or special offers.

Prior to the beginning of an accounting period, and after cardholders have registered their particular financial card with the loyalty system, the agreement between the cardholder and the loyalty system may be implemented by the merchants who set the offers and incentives that will be made to cardholders of certain BIN ranges (these are examples of the merchant rules).

When a cardholder transacts with one of merchants under the applicable loyalty program, the loyalty system 26 is operable to review the benefits applicable to the BIN number and either 1) accrue the points/cash discount (less the administration amount paid to the card issuer) to the cardholder from the transaction, by reflecting such accrual in the benefits account for the cardholder. The cardholder is notified of the award of points, and the card issuer is notified of the accrual set aside by the loyalty system to be paid by the merchant at the end of the accounting period. These amounts are separate from the amounts paid to the card issuer through the interchange system, unless a special rate for the loyalty system has been established and applied by the merchant acquirer.

The loyalty system accrues the points/special cash back awards for each cardholder and what is owed the card issuer by the merchant. Merchants generally pay cash or cash in lieu of points as a reward to the card issuer. Different incentives/rewards can apply to different BIN ranges by a single merchant or by a group of merchants.

In summary, the merchant rules applicable for a specific accrual period are applied so as to update the benefit account 34 for the particular cardholder, for example. Generally speaking, the loyalty system 26 is operable to, after an accrual period has come to an end, to verify the accrued amounts in the benefit accounts 34. These can then be accessed and displayed by members or cardholders.

After an accrual period is closed, the loyalty system 26 may then permit members to access the loyalty system 26 to engage in a number of transactions in connection with their accrued benefits such as redemption, conversion of fees to points etc.

A particular process for conversion of fees to points will be described as an illustrative example with reference to the point conversion utility 54. The point conversion utility 54 enables enhancement of a card issuer's exiting loyalty programs based upon points or cash back cardholder benefits created by cardholder use in connection with a loyalty program and provided by incentives offered to cardholder. The point conversion utility 54 may allow the card issuer to reward their cardholders in the same format as under their existing cardholder program. These points and rewards are examples of incentives.

For instance, some existing financial cards have points or cash reward systems or a combination of both to promote financial card use. The cardholder may accumulate points and cash rewards for later use. The loyalty system 26 allows for the card issuer to take all or a portion of existing fees developed from financial card use and apply them to cardholder points or cash. Alternatively, the loyalty system 26 could be utilized by card issuer to create an additional source of revenue from the merchant fees by not converting all of the collected fees and giving the benefit to the financial card holders.

The fee and point information may be transferred to the card issuer at "X" days after the end of an accumulation period. The information is later integrated by existing financial card issuer software to consolidate the point and/or fees that are passed on to the cardholder.

The conversion from points to fees is accommodated by comparing the transaction data of identified cardholders against rule-sets created and maintained by the card issuer. The rule-sets may, for example, contain the following information regarding transaction data: 1. Transaction Amount 2. Transaction Date 3. Transaction Time 4. Merchant ID 5. Card Holder ID 6. Card BIN number An example of a card issuer rule-set includes: Card Holder Bin number "1111" minimum qualifying transaction with Merchant "A" is $100.00; No Maximum qualifying transaction or conversion restrictions exist; The transaction must occur between 00:00:00-00:07:00 EST; The transaction must occur between Jan. 1, 2004 and Jan. 15, 2004; Card Issuer would like to give card holder 1.0 point for every dollar transacted with merchant "A"; Merchant "A" Card Holder Id 0-10000 Card Holder BIN Number "2222"; Minimum qualifying transaction with Merchant "A" is $100.00; Maximum qualifying transaction amount is $1000.00; Transaction must occur between 00:00:00-00:07:00 EST; Transaction must occur between Jan. 1, 2004 and Jan. 15, 2004; Card Issuer would like to give card holder 1.0 point for every dollar transacted with merchant "A"; Merchant "A" Card Holder Id 0-10000; Card Holder BIN Number "3333"; Min. qualifying transaction with Merchant "A" is $100.00; Maximum qualify transaction amount is $10,000.00; Transaction must occur between 00:00:00-00:07:00 EST; Transaction must occur between Jan. 1, 2004 and Jan. 15, 2004; Card Issuer would like to record card holder $0.01 benefits for every dollar transacted with merchant "A"; and Merchant "A" Card Holder Id 0-10000.

In another example of the related transaction detail: Card Holder BIN number "1111"; Transaction Amount: $104.00; Transaction Date: Jan. 1, 2004; Transaction Time: 00:00:12; Merchant: "A"; and Card Holder ID: 1.

The example result may be that system 26 would calculate 100 points for the transaction detail and record the transaction information and related conversion amount 100 points as cardholder attributes in storage device 32.

In yet another example of the processing of a transaction: Transaction Detail Card Holder BIN Number "2222" Transaction Amount: $90.00 Transaction Date: Jan. 1, 2004 Transaction Time: 00:00:12 Merchant: "B" Card Holder ID: 999999=

The example result may be that system 26 would NOT create any points for the transaction because the transaction failed to meet the criteria for point conversion for the transaction detail Merchant "B" is not part of the conversion rule-set Card holder is not part of any existing rule-sets In yet another example of the processing of a transaction: Transaction Detail Card Holder BIN Number "3333" Transaction Amount: $900.00 Transaction Date: Jan. 1, 2004 Transaction Time: 00:00:12 Merchant: "A" Card Holder ID: 999999

The example result may be that system 26 would record $0.90 of benefit associated with the above transaction information tied to the card holder ID number of "999999".

An example process in connection with the generation of reports based on the contents of data storage device 32 will now be described. A system administrator of the operator of the loyalty system may access certain reports in connection with merchant activity in connection with particular BIN ranges. Similar processes and system implementations may be used to generate other reports of information accessible to card issuers, merchants, members or merchant acquirers. The loyalty system 26 is operable to generate reports for card issuers to track the use and monitor the results of financial card use with identified merchants.

For instance a card issuer may wish to view the status of conversion of points to fees. The loyalty system 26 may allow for a System Administrator to log in and generate reports regarding the amount of fees that have been converted to points to monitor the effectiveness of the applicable loyalty program.

As an illustrative and non-limiting example, the System Administrator enters the following parameters for report generation on behalf of the card issuer: 1) Start Date 2) End Date 3) BIN Number 4) Financial Institution ID 5) Merchant ID 6) Transaction Time 7) Transaction Terminal ID 8) Report Type. The loyalty system 26 may return the data associated with the transaction(s) to monitor the points and fees collected and converted to allow the card issuer to view data regarding the status of the system.

A card issuer may want to know which merchants are supporting a particular financial card to judge the effectiveness of the business relationship between the merchant and the cardholders. By examining the transaction information the card issuer can judge the effectiveness of having particular merchants within the loyalty system, based on collected merchant fees. A cardholder may elect to charge the merchant additional fee amounts as the merchant receives strong support from the cardholders of a particular card issuer.

The described reporting functionality can also be used to track the data necessary to integrate the data of points and fees held within the loyalty system for a given time period. A card issuer may elect to view the information to keep current information regarding benefits that are due to the cardholders.

By examining the data of accumulated points and fees a card issuer may elect to alter the conversion rules to give more benefits to the cardholders and thereby create more demand for a financial card use at a particular merchant(s). This type of reporting can also be used to prove the value to the merchants and cardholders derived from card use at an identified merchant(s).

Merchants may generally view only the information regarding the transactions that were made with identified cardholders. The loyalty system 26 may allow for a System Administrator to see the following information: 1) Time range of transactions 2) Date range of transactions 3) BIN Range of transactions 4) Summary amounts of transactions.

The loyalty system 26 may generally restrict the information that the merchant can view by providing summary data only. The summary data protects the cardholders from direct exposure of private cardholder information, while allowing the merchant to view the status of the program. The loyalty system 26 may use summary data to recommend incentives or raw data.

For instance a merchant may wish to know how certain cards identified by BIN number are contributing to his sales. By comparing this information with historical reports and current internal customer payment methods a merchant can judge which financial card types are providing the most benefit for his organization.

A example process for customizing loyalty programs involving cardholders will now be described, and specifically a system administrator for the operator of the loyalty system may adjust the parameters associated with reward generation and change incentives (based on e.g. recommended incentives) in connection with specific members.

The cardholder benefits processing utility 30 may be further configured for processing financial transactions (or transaction utility (not shown) that is operable to conduct electronic transactions between loyalty system 26 and the card issuer system 38) possibly also between the loyalty system 26 and the merchant acquirer system 40.

The cost of acquiring new customers is generally quite high, and this is a cost that merchants tend to monitor very closely. Particularly if a merchant's relationship with card issuers by operation of loyalty system 26 permits the merchant to acquire a new customer through the card issuer, merchants will generally be willing to provide to the cardholder and/or to the card issuer relatively significant incentives in consideration of obtaining the new customer. Loyalty system 26 may enable a merchant to target incentives to particular sub-groups of cardholders, depending on their interest (e.g. cardholder attributes) to merchant.

For example, a cardholder whose BIN number is associated with the program may go to a merchant who is also associated with the program. Within the loyalty system 26, the cardholder may be given a code to be presented at the merchant's location that reflects a discount offer (e.g. incentive). Upon payment, the cardholder receives a discount on monies owed. The cardholder in the above example is also given an additional item (e.g. a further incentive) from the merchant's inventory as recognition for the cardholder being a member of the applicable loyalty program.

After the cardholder transaction has been completed, the transaction data is relayed to the loyalty system 26 and the cardholder benefits processing utility 34 is operable to automatically offer prize entries as a follow up to the cardholder's purchase (e.g. a further incentive), based on the loyalty program rules defined by the merchant.

After the cardholder transaction has been completed the transaction data may be relayed to the loyalty system 26. The loyalty system 26 defines in accordance with a particular loyalty program a set of rules to complement existing points programs by converting the transaction data (e.g. identified merchant, amount of transaction, date of transaction, time of transaction) to convert the transaction into points in connection with the applicable card issuer's BIN range point program and based upon parameters set by each participating merchant. For instance, the system 26 may convert transaction incentives or prizes within the loyalty program to points provided through the card issuer to the cardholder based on a pre-determined formula (usually based on an arrangement between the card issuer and the merchants, facilitated by the operator of the loyalty system). The loyalty system 26 would for example convert a $100.00 spent by a cardholder under a loyalty program into 100 points if the transaction was completed between the hours of 00:00:00 and 12:00:00 Monday through Friday and 50 points at any other time for the particular card used at a particular merchant.

The cardholder in the above example visits a merchant participating in the loyalty system 26. The cardholder chooses to use the financial card that is registered with the loyalty system 26 over other financial cards, and completes a transaction. The loyalty system 26 identifies the merchant, the date, the amount and optionally the time of day and the terminal ID and also establishes any accrued benefits including points, prizes or discounted offers. The card issuer in this case receives additional revenue from increased card use as the cardholder chooses the registered card issuers' card over another financial card.

The loyalty system 26 allows for the existing point programs operated by the card issuer to be identified and supported within the loyalty system 26. This occurs when, after conversion of incentives (for example) into points, the card issuer then applies additional incentives through its own point system thereby creating an enhanced points program.

It is possible that the card issuer would charge the operator of the loyalty system 26 (or the merchants themselves) for access to BIN ranges of cardholders, and other attributes of cardholders. The charges could depend on the efforts expended by the card issuer to encourage cardholders to enroll in the loyalty program. Or, the card issuer may elect to charge differing amounts for loyalty system 26 access depending on the demographics and other attributes of particular cardholders.

A card issuer increases its revenue by offering incentives to consumers to use a particular financial card with a greater number of merchants. Merchants associated with the loyalty system 26 provide incremental incentives to cardholders in certain BIN ranges. This way the card issuer and the loyalty system 26 cooperate to bring more business to the common group.

The card issuers may elect to charge the cardholders an annual fee to carry a financial card that is associated with a particular BIN range, and thereby also eligible for certain richer benefits in connection with a loyalty program. The additional annual fees represent an important source of additional revenue to the card issuer.

As previously stated, a merchant belonging to the loyalty system 26 may choose to offer rewards/incentives based upon time of day and date. The incentives may also be based on a particular good or service. The merchant's merchant acquirer provides selected information relating to particular BIN ranges, transactions, dates and times (e.g. attributes). The loyalty system identifies the merchant, the time of day and the date and applies differential incentives either through the loyalty system or in the form of differential points transferred to the card issuer for the cardholder.

The merchant through the loyalty system 26 contracts with the merchant acquirer for anticipated additional transactions from a particular set of BIN numbers. The merchant acquirer is rewarded for the service in the form of a transaction fee or monthly fee through the loyalty system. The merchant may pay a differential rate for an access to a particular BIN as the cardholders to a particular BIN may offer a greater opportunity for transactions.

A merchant acquirer may realize additional revenues due to differing transaction fees associated with differing BIN number acceptance as a form of payment by a participating merchant. The merchant acquirer may elect to charge differing transaction fees for acceptance of cards within certain BIN range of a participating card issuer.

Loyalty system 26 may provide an opportunity for merchants, and for card issuers if they are willing, to efficiently operate and maintain their own loyalty program that provides the ability to share customers through cross-promotion between card issuers and merchants, and also cross-promotion between merchants involving cardholders who become members. Loyalty system 26 may enable card issuers and merchants to obtain direct customer feedback and to perceive measured results regarding customer transactions at each merchant, including bases on analysis of BIN number ranges by operation of the loyalty system of the present invention.

The card issuers may be provided with an economic interest to motivate the cardholders to become members of the loyalty system and to transact with merchants in order for the cardholders who are members to obtain benefits from the merchants (or from the card issuer based on an arrangement with the merchants). Recommended incentives tailored to a target segment may be a mechanism to increase transactions by cardholders. Again, customers of a co-branded card for example may be identified within the loyalty system 26 by means of their financial card BIN range number through the registration process, thereby enabling subsequent transactions involving particular cardholders and particular merchants to be tracked and measured results to be proven to card issuers and merchants alike.

Benefits or incentives may be accrued on behalf of members (including members who are cardholders) in a number of ways. The benefits themselves can vary. For example, pre-set benefit application or payment rates are associated with particular transactions associated with the loyalty system 26.

Within the loyalty system 26, merchants may be motivated to develop new and innovative loyalty programs (through the use of recommended incentives) that will automatically be accessible to cardholders. This saves the card issuer the time and resources generally required to devise new loyalty programs and enter into associated arrangements with their partners, often separately for each program.

Loyalty system 26 may provide a means of generating financial transactions and/or customers for financial institutions or merchants, or both.

Loyalty system 26 may provide flexibility in the arrangements made by the merchants, or in fact in some bases between the merchants and the card issuers, as it relates to the benefits provided to cardholders who become members. These arrangements can define the pre-determined benefits associated with particular transactions, e.g. a per transaction benefit to the cardholder or in fact to the card issuer. As such, loyalty system 26 may provide a potential source of new revenue for the card issuer to the extent that not all of the benefits earmarked for cardholders' transactions is actually passed on to the cardholders.

It may be open to the card issuer to also provide benefits or incentives to cardholders in connection with transactions associated with the loyalty system. For example, card issuers may want to enhance incentives available from merchants in connection with specific transactions with incentives that they are themselves providing because for example the impact of client retention of a preferred customer who is a golfer might be enhanced if an incentive from the card issuer is provided specifically in connection with a transaction that brings happiness to the golfer, i.e. golf. The loyalty system 26 can assist with incentives may recommending incentives for target segment. Alternatively, the card issuer could "top up" benefits provided by merchants, thereby enhancing the merchant's relationship with the cardholder who is a member, if the merchant is a customer of the card issuer or a related entity of the card issuer.

Consequently, the loyalty system 26, at little or no additional cost, can be used as a means of generating additional new business for the card issuer.

Loyalty system 26 may effectively permit some merchants who would otherwise not be able to enter into co-branded card type arrangements (e.g. because of start up costs or because of the merchant is a regional retailer where the merchant might not otherwise be attractive to a large financial institution) to provide loyalty programs. Accordingly, loyalty system 26 may allow regional merchants to compete better against national chains that may have more resources to dedicate to building loyalty programs.

Loyalty system 26 may provide a loyalty program with a low cost way to acquire customers and pay for them over future transactions. It may also provide the co-branded partner the ability to expand transactions on the current card base, both from the initial referrals and subsequent transactions resulting from cross promotional offers within the loyalty system among other merchants.

A financial card can be moved to the front of the wallet to be used for more transactions, where the cardholder is motivated to use the card based on incentives that are recommended for the particular cardholder based on associated attributes.

Cardholders of selected co-branded financial cards may become members where the co-branded partners' service or product is not really competitive with the loyalty system merchants. Accordingly, use of co-branded cards in connection with the described loyalty system 26 may protect transaction market share for both the card issuer and co-branded partners' market share.

The card issuer, the co-branded partner and the merchants of the loyalty program may increase their customer transactions through sharing customers.

Flexibility may be provided to card issuers and merchants to devise, implement, and then measure the effectiveness of, various cross-promotional initiatives, can dramatically increase the returns on investment of card issuers and merchants alike, in connection with their customer retention and customer acquisition activities. Further, the loyalty system 26 may facilitate this process by providing recommended incentives for various loyalty programs.

Other implementations and extensions may be implemented by loyalty system 26. For example, various security methods and technologies for restricting access to resources of the loyalty system 26 to those authorized to do so by the operator of the loyalty system 26 may be used. Loyalty system 26 may use various existing and future technologies to process payments by operation of the transaction utility 38. Loyalty system 26 may provide various tools and interfaces for interacting with the loyalty system. The system 26 may also allow for robust reporting which may include comparative reports of member affinity or of transaction history with participating merchants. In other words, member transaction history may be different for differing groups of members based on member affinity.

Data storage device 32 maintains benefits accounts 34*a*, merchant accounts 34*b*, card issuer accounts 34*c* for storing attributes regarding merchants, cardholders and card issuers. The attributes may be used to determine incentives to offer in relation to various loyalty programs.

Loyalty system 26 may include a card issuer system 38 which may be configured with various computing applications, such as a points/rewards program 64, cardholder registration 68, card issuer reporting tool 66, and a data storage device with cardholder and transaction data 70. The points/rewards program 64 may manage loyalty programs offered by card issuer system 38 independently or in conjunction with loyalty system 26. Existing loyalty data tool 58 may interact with points/rewards program 64 regarding loyalty programs offered by card issuer system 38. The points/rewards program 64 may populate cardholder and transaction data 70 based on data collected from loyalty programs. Cardholder registration 68 may enable cardholders to register for financial cards with card issuer. Cardholder registration 68 may populate cardholder and transaction data 70 based on data collected from registration. The card issuer reporting tool 66 may generate reports based on cardholder and transaction data 70 and data maintained by loyalty system 26 as part of data storage device 32. Data storage device 32 may maintain a copy of cardholder and transaction data 70, or may contain separate data. Data scrub utility 56 may normalize, scrub, convert and perform other operations on data received from card issuer system 38. Loyalty program module 22 may be used to create and manage various loyalty programs for card issuer system 38 and may interact with points/rewards program 64.

Loyalty system 26 may include a merchant interface 52 for interacting with merchant system 40 and generating various interfaces for display on merchant system 40. The merchant interface 52 may provide a mechanism for merchant system 40 to create, customize, and manage loyalty programs and incentives. Data scrub utility 56 may normalize, scrub, convert and perform other operations on data received from merchant system 40.

Merchant system 40 may be configured with various computing applications, such as merchant reporting tool 66 for generating reports regarding loyalty programs and for displaying interfaces received from merchant interface 52 to create, customize, and manage loyalty programs and incentives. A computing application may correspond to hardware and software modules comprising computer executable instructions to configure physical hardware to perform various functions and discernible results. A computing application may be a computer software or hardware application designed to help the user to perform specific functions, and may include an application plug-in, a widget, instant messaging application, mobile device application, e-mail application, online telephony application, Java application, web page, or web object residing, executing, running or rendered on the merchant system 40.

Merchant system 40 is operable to authenticate merchants (using a login, unique identifier, and password for example) prior to providing access to applications and loyalty system 40. Merchant system 40 may be different types of devices and may serve one user or multiple merchants. For example, merchant system 40 may be a merchant acquirer system 40 may serve multiple merchants. Although merchant system 40 is depicted with various components in FIG. 1 as a non-limiting illustrative example, merchant system 40 may contain additional or different components, such as point of sale system or other transaction processing system.

Merchant system 40 may include one or more input devices, such as a keyboard, mouse, camera, touch screen and a microphone, and may also include one or more output devices such as a display screen and a speaker. Merchant system 40 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Although only one merchant system 40 is shown for clarity, there may be multiple merchant systems 40 or groups of merchant systems 40 distributed over a wide geographic area and connected via e.g. network.

Merchant system 40 includes data storage devices storing merchant data 72 particular to the merchant, such as geographic location, inventory records, historical records, and the like. Data storage devices may also store customer and transaction data 74 such as customer names, addresses, contact information, target potential customers, transaction details, and so on.

While the example systems in FIGS. 1 and 2 are generally directed to loyalty systems, the aspects of the connected systems may be directed towards an advertising verification system. For example, in addition to or in place of any of the systems 26, 38, 40, 80 in FIG. 1 or 2, the connected systems may include an advertising system for generating and/or displaying advertisements. Accordingly, aspects of these advertisements may be used to verify when an advertisement corresponds to an actual purchases at a merchant. In some examples, this may be useful for verifying the effectiveness of advertisements or for determining commissions or other advertising remuneration.

Figure 3:
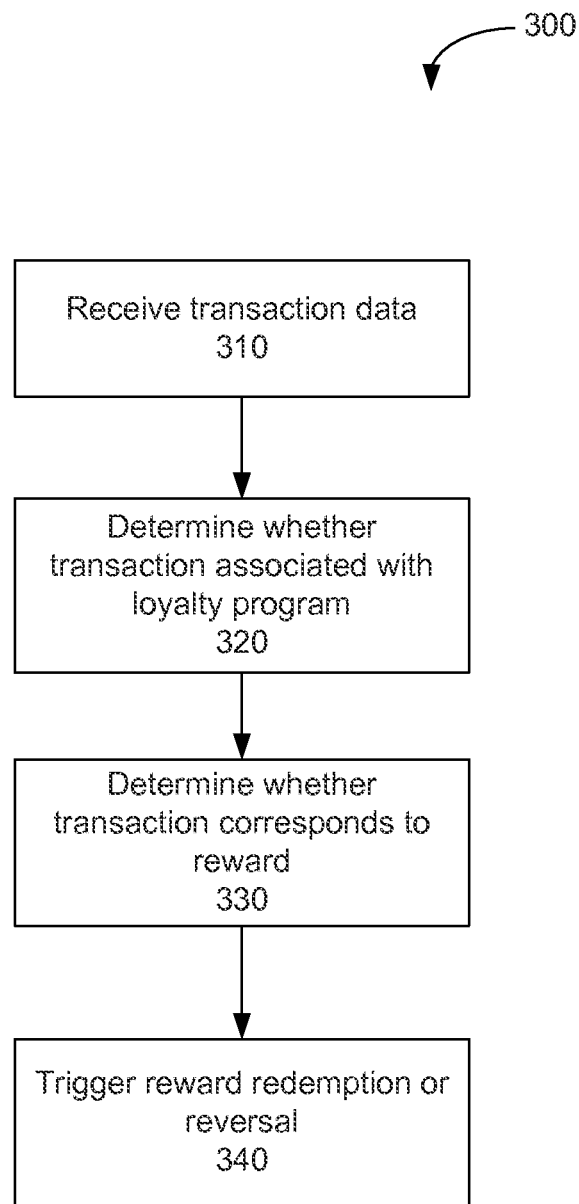

Reference will now be made to FIG. 3 which provides a flowchart diagram of an example method for verifying a transaction. While the example embodiments described below relate to rewards and loyalty systems, in a similar manner, similar systems and methods can be applied to an advertising verification system for tracking purchase transactions back to advertisements activated by a customer.

At 310, one or more processors at the loyalty system 26 can be configured to receive transaction data. This transaction data can correspond to transactions performed via the card issuer such as a financial institution or payment processor. This transaction data may be received periodically, sporadically, or in real or near-real time. The transaction data can be received individually for each transaction, or in batches or other groupings comprising transaction data for multiple transactions. In some examples, transaction data can be received in batches, for example, after a merchant or card issuer has posted its transaction data. While the posting of transaction data may occur immediately, the posting of transaction data may sometimes occur with a delay between the original transaction and the posting of the transaction data. In some examples, the systems and methods described herein may address challenges associated with incomplete transaction data received by the loyalty system and the timing disconnect between the occurrence of the transaction and the receipt of its corresponding data.

For example, in some example scenarios, wherein the loyalty system 26 is physically, logically, and/or owned/operated separately from the card issuer system 38, the merchant system 40 and/or a transaction processing system, the loyalty system 26 may have little or no control over the information received in the transaction data and/or the timing of the receipt of such information. Therefore, in some such scenarios, incomplete or limited transaction information and/or a timing disconnect between the occurrence of the transaction and the receipt of its corresponding data may cause technical challenges to the operation of the loyalty system. Such technical challenges may be overcome by at least some of the embodiments disclosed herein.

At 320, one or more processors at the loyalty system 26 can be configured to determine whether the received transaction data is associated with the loyalty program. This can include, for example, determining whether the transaction involves one or more participants of the loyalty program or involves an appropriate type of transaction. A participant can include a merchant participant, a cardholder participant, a charity participant, a card issue participant, an advertising participant or any other participant in the loyalty program. This determination can be performed on a per-transaction basis.

In an embodiment, a group or batch of transactions may be processed together. For example, the loyalty system 26 may be configured to identify multiple transactions with shared or similar characteristics (e.g., having the same participants, from the same time period, etc.). Such identification may be performed using filters, heuristics, templates, or the like, or a combination thereof. Such identification may allow multiple transactions to be processed together, e.g., to make the same determination for each of the transactions. In this way, processing efficiency may be improved and utilization of processing resources may be reduced. In an embodiment, the loyalty system 26 may accumulate received transactions until groups or batches of sufficient size (e.g., meeting a pre-defined threshold) are available for efficient processing together.

Upon determining that transaction data for a transaction or group of transactions is associated with the loyalty program, one or more processors at the loyalty system 26 can be configured to store the transaction data. In some examples, the data can be stored in the format in which it is received. However, in some examples, storing the data can include reformatting the data, creating new metadata, removing portions of the data and/or converting the data for the loyalty system's purposes.

In some examples, transaction data which is determined to not be associated with the loyalty program may be discarded or stored in a separate location or data structure.

At 330, the one or more processors can be configured to determine whether the transaction data for a transaction corresponds to a reward or advertisement. In some examples, matching a transaction to a reward/advertisement can be based on any number of the existence of a reward, the activation time of the reward, the expiry date of the reward, the existence of other rewards, previous redemptions, timing of the transaction, and other considerations.

Reward/advertisement matching can, in some examples, include determining whether the transaction meets aggregate spending or number of transaction thresholds.

At 340, when the transaction corresponds to a reward or advertisement, the one or more processors can be configured to trigger redemptions or reversals of rewards. In some examples, redemptions/reversals can include marking rewards/ads as redeemed and/or reversing previously redeemed rewards/ads.

FIGS. 4-8 illustrate flowcharts of aspects of an example method for verifying a transaction. Aspects of these flowcharts may be performed by the loyalty system 26, or any other system involved in the loyalty or advertisement program.

Figure 4:
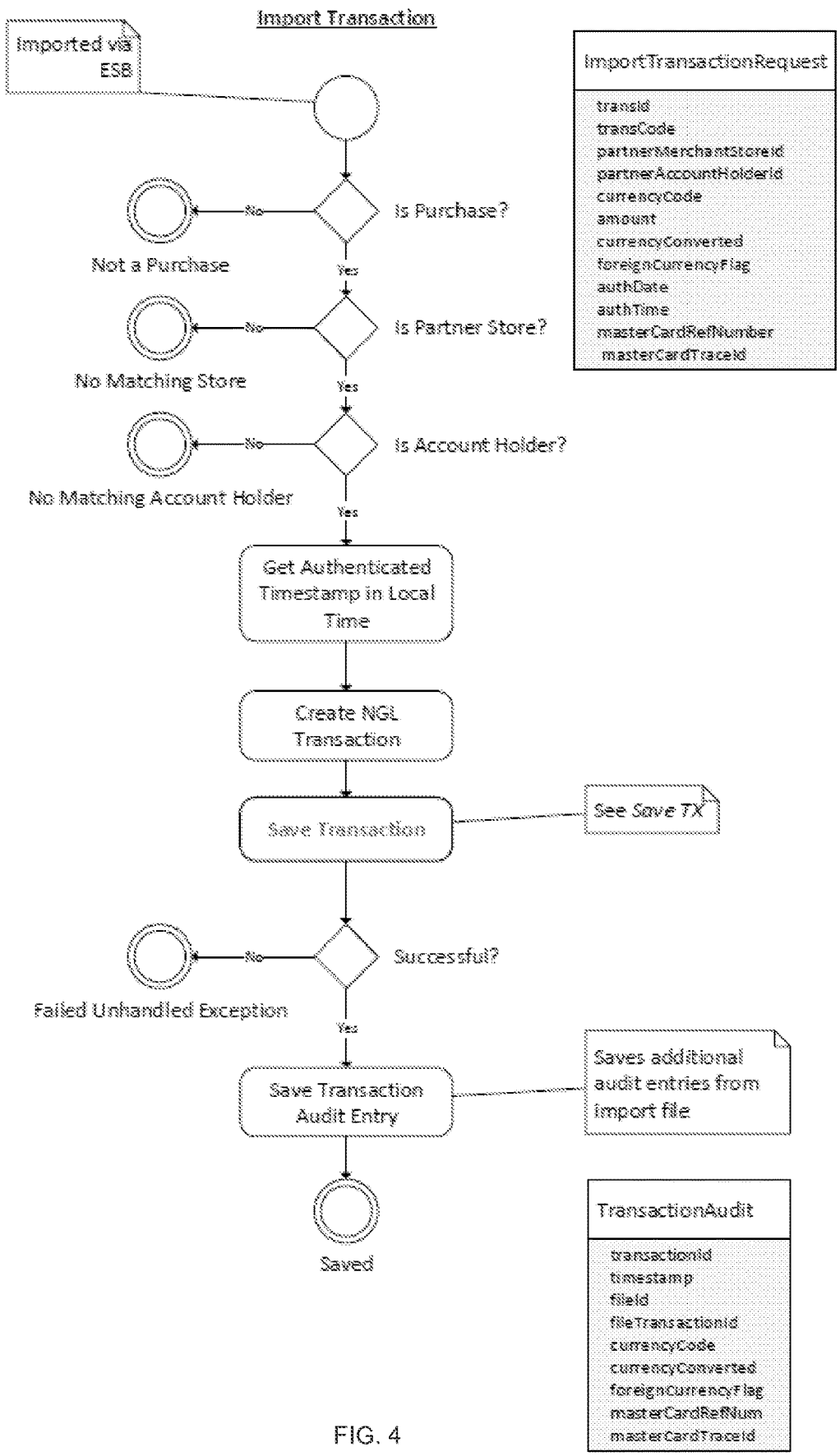

As illustrated on FIG. 4, transaction data can be received by one or more processors by way of a networked data connection such as an enterprise service bus or other data connection, wirelessly, or via a physically transportable medium or media such as a CD, DVD, flash memory, portable hard drive and the like. In some examples, the transaction data regarding a transaction can include fields other data structures including transaction identification codes, transaction codes, merchant store identification codes, cardholder account identifiers, currency codes, transaction amounts, currency conversion data, transaction authorization dates and times, card issuer reference numbers or trace codes, and any other data associated with a transaction. This transaction data may be a complete or subset of data generated or collected by a card issuer/processor and/or merchant. In some examples, one or more of the identifiers, identification codes and/or other transaction data may include or may be in the form of a token or other substitute identifier for hiding or otherwise protecting sensitive data.

In some examples, the transaction data may be grouped into records or other formats or data structures.

In some examples, the loyalty system may be physically, logically and/or operationally separate from any transaction processing system, card issuer system, and/or merchant system. For example, the loyalty system may not be integrated with any point-of-sale terminal, and/or may not have access to customer or merchant information stored at the card issuer or other system. In some such examples, the loyalty system may allow for the implementation of a loyalty program and/or the matching of transactions with only transaction data being received from one of the other systems. In some instances, receiving only partial or limited transaction information such as only a merchant ID, a customer ID, and a transaction amount, may create technical challenge(s) for the loyalty system.

Using the transaction data, one or more processors can be configured to determine if the transaction corresponds to a purchase or a return. In some examples, this can involve evaluating a transaction code or a transaction amount. Transaction data corresponding to other transactions such as inquiries, payment refusals and the like may be determined to not be associated with the loyalty program and may be discarded or stored separately.

Using the transaction data, one or more processors can be configured to determine if the transaction was conducted at a merchant participant/partner or was conducted by a customer participant/partner of the loyalty program. In some examples, this can involve evaluating merchant identification codes, and account holder identification codes against database(s) of registered loyalty merchants and customers.

Transaction data which does not correspond to both a registered merchant and a registered customer can, in some examples, may be determined to not correspond to a reward. However, in some examples, transaction data which corresponds to a merchant member but not a customer member, or to a customer member but not a merchant member, may be stored or processed for other purposes. Some example purposes include advertisement verification, aggregate merchant activity information, aggregate customer activity information, and/or any other purpose.

The transaction data which is determined to be associated with the loyalty system can then be stored in its original received format or otherwise. In some examples, storing the data can include transforming the data, e.g., reformatting the data, creating new metadata, removing portions of the data and/or converting the data for the loyalty system's purposes. For example, as illustrated in FIG. 4, the time of the transaction may be converted into a local time of the merchant, customer, card issuer, loyalty system or otherwise. In another example, the transaction data can be converted into a format used by the loyalty or other system such as a "Next Generation Loyalty" or NGL transaction.

Transforming the data for storage may facilitate more efficient storage, e.g., by reducing the amount of data to be stored, or by improving the efficiency and/or effectiveness of any compression or encryption applied to the data. Transforming the data for storage may also facilitate more efficient retrieval, e.g., by improving indexing or searching by way of metatags.

The transaction data can be saved at a location/database accessible by the loyalty system or other system. As illustrated in FIG. 4, at this point, aspects of the example method can continue with the Save Transaction flowchart illustrated by way of example in FIG. 5.

Figure 5:
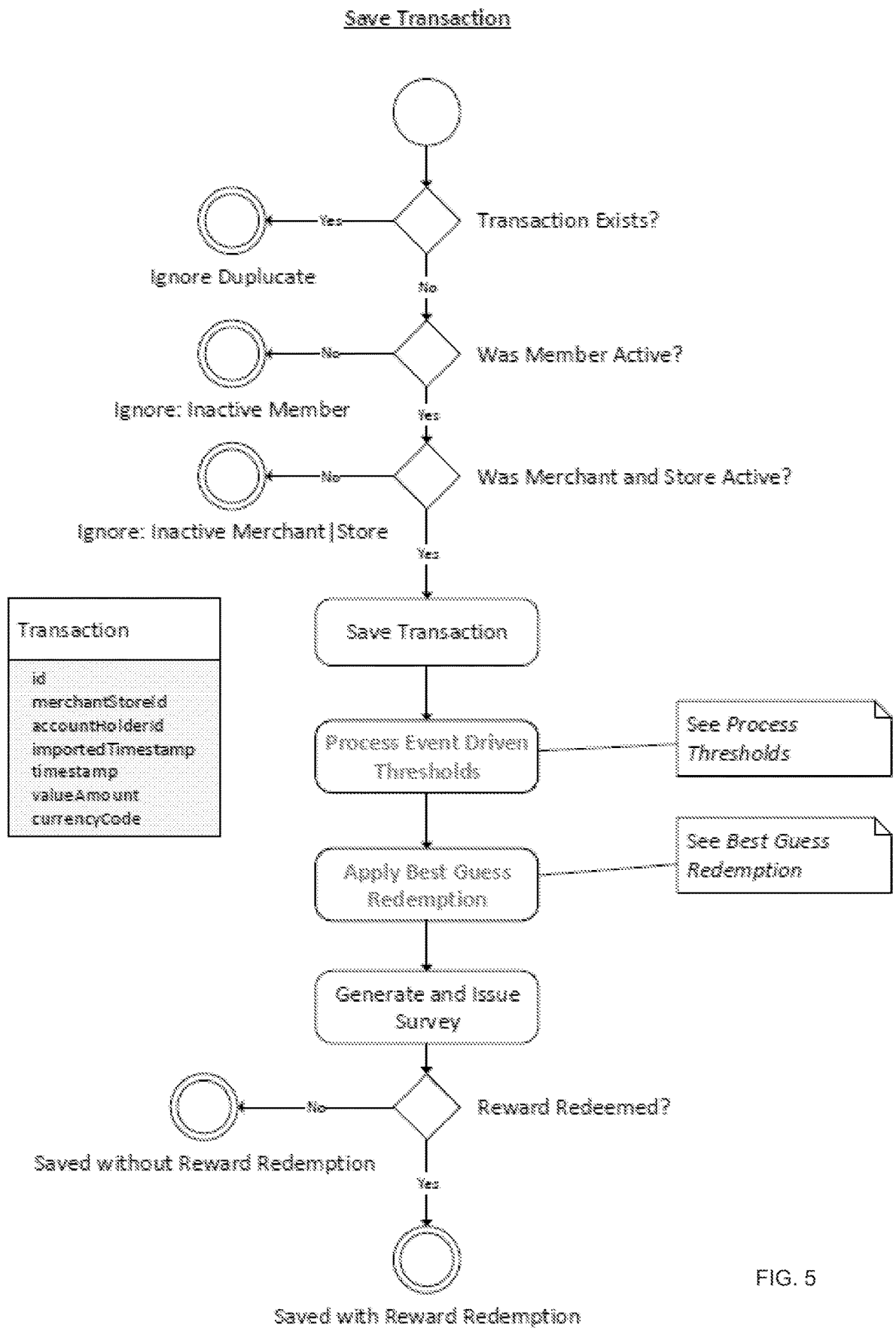

As illustrated in FIG. 5, an example NGL transaction may include a new identification code, a transaction ID, the merchant ID, the customer ID, a timestamp of when the transaction data was received, a transaction time, a transaction amount, and a currency code.

Referring again to FIG. 4, upon successful saving of the transaction data, an audit entry can be generated to include data from the received transaction data which may or may not have been stored with the transaction data retained and stored for the loyalty or other system. Should a transaction not be successful in being saving, an exception may be triggered.

With reference to FIG. 5, before the transaction data is saved, in some examples, one or more processors may be configured to determine whether the transaction data has already been stored/imported into the system. In some examples, this may involve comparing the transaction ID or other received transaction data against transaction data already stored in the loyalty or other system. If a corresponding entry is found in the loyalty or other system, the received transaction data may be discarded, stored separately, or otherwise ignored.

In some embodiments, one or more processors can be configured to determine whether the member corresponding to the received transaction data was active at the time of the transaction. In some examples, this may involve comparing the transaction time and customer/account holder ID with information regarding the time of day or the location of the member stored in the loyalty or other system.

In some embodiments, one or more processors can be configured to determine whether the merchant corresponding to the received transaction data was active at the time of the transaction. In some examples, this may involve comparing the transaction time and merchant store ID with information regarding the merchant location stored in the loyalty or other system. For example, the transaction time may be compared to determine whether the merchant location was open for business at the time of the transaction. In other examples, this may involve determining whether the merchant (or particular merchant location) was participating in the loyalty program at the time of the transaction. For example, it may be determined that at the time of the transaction the merchant (or merchant location) may not have been fully enrolled in the program, or may have withdrawn from the program, or may have been expelled/suspended from the program (e.g., for non-payment or other reason). In an embodiment, the above-described comparisons may employ heuristics, hashes, or the like, or a combination thereof, to improve processing efficiency.

Upon satisfying itself that the transaction corresponding to the received transaction data is valid, the transaction data can be saved in the manner described above or otherwise. In some examples, the transaction data can be saved regardless of or in the absence of any preliminary validity checks.

Figure 6:
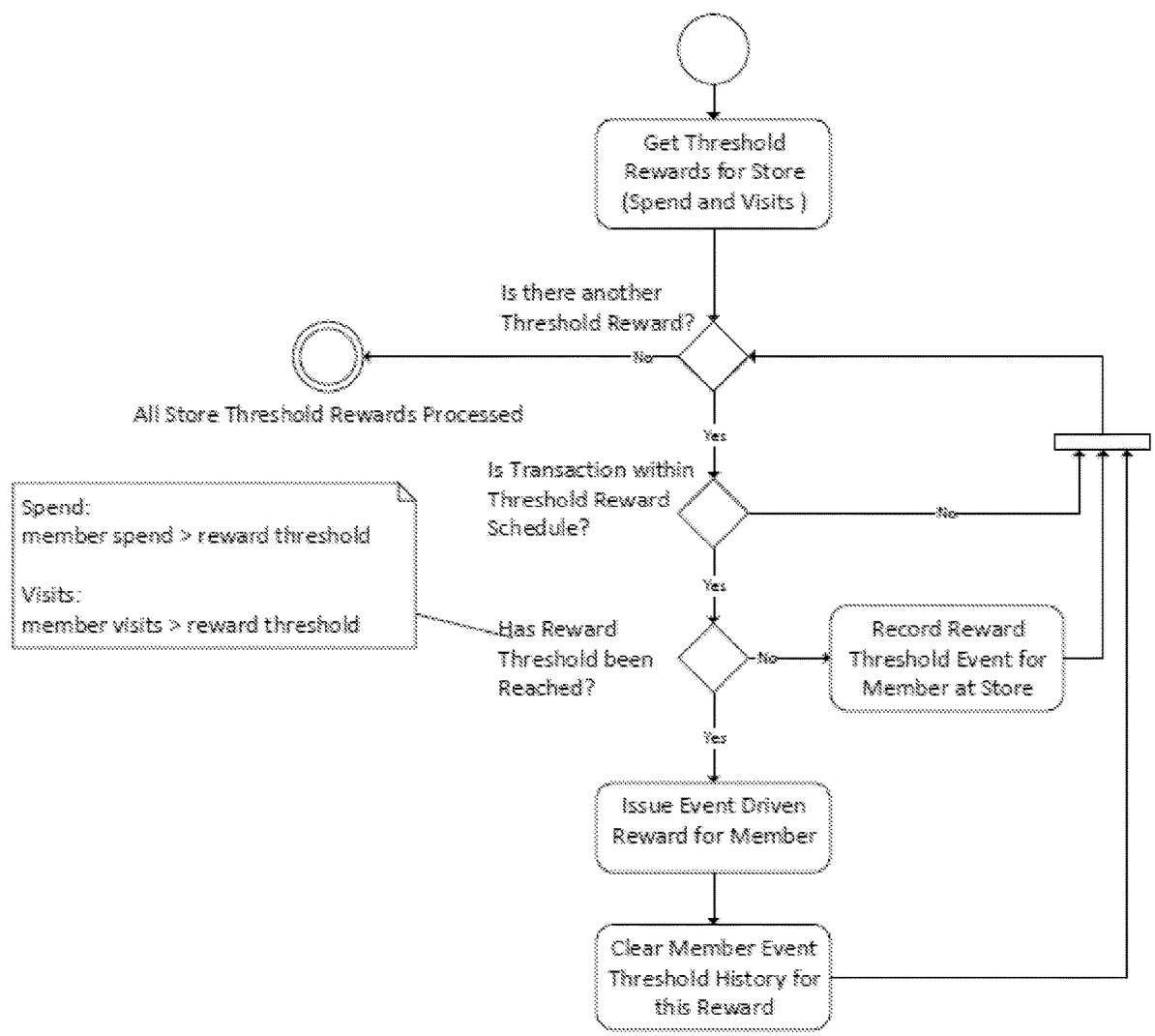
Figure 7:
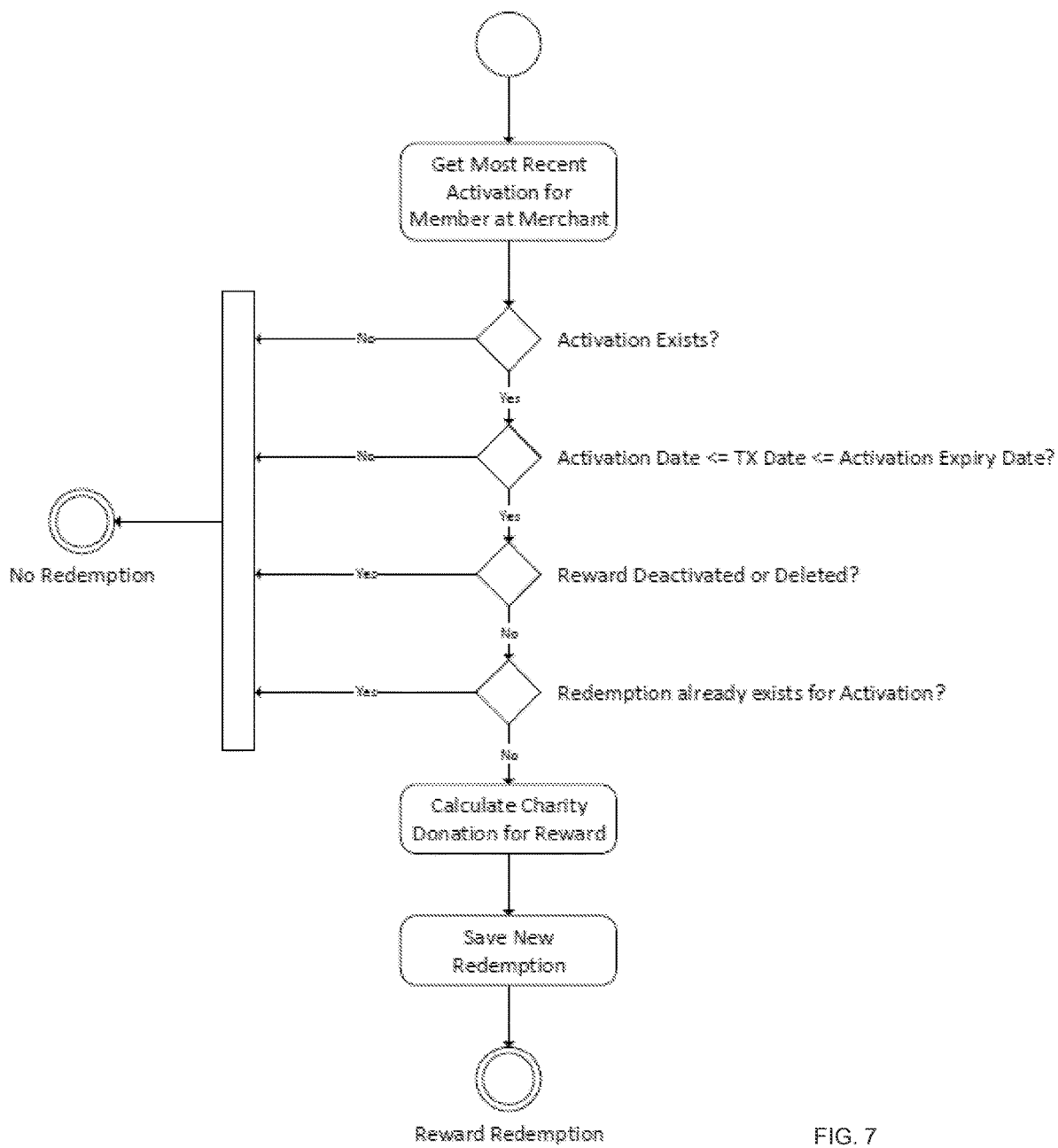

At this point, the example method can continue to process the received transaction data against process event driven thresholds (continued, for example, in the Process Thresholds flowchart in FIG. 6), and/or best guess reward and/or advertisement redemption (continued, for example, in the Best Guess Redemption flowchart in FIG. 7).

Before, concurrent with, or after completing the matching/transaction verification process(es), the one or more processors can be configured to generate signals for issuing a survey to the customer associated with the transaction. In some examples, this survey can be sent electronically to an electronic address or device associated with the customer, or can be issued to an online portal or other system accessible to the customer.

In some examples, signals representing the response(s) to the survey can be used to verify the reward or advertisement matching/verification process(es). For example, the survey may include one or more questions asking whether the transaction was conducted at least in part based on a reward or advertisement, or similar question(s). In some examples, the survey may ask whether the transaction was conducted at least in part based on a specific reward or advertisement.

In some examples, other signals can be received by the one or more processors to verify the matching of a reward or advertisement. For example, if a reward or advertisement is presented to the merchant by the customer either in print or via a mobile device, signals can be generated by the customer's mobile device or a merchant device to indicate to the loyalty or other system a transaction is being triggered in conjunction with a reward or advertisement. In some examples, these signals can include times, reward or advertisement identification(s), or transaction information.

Upon determining whether the reward/advertisement was redeemed/verified/matched, one or more processors may be configured to store data linking or otherwise indicating that the transaction was or was not matched/verified with one or more rewards and/or advertisements.

FIG. 6 shows a flowchart illustrating an example method for determining event driven thresholds. In some examples, one or more processors may be configured to retrieve or otherwise have access to available reward/advertisements. In the example method shown in FIG. 6, the rewards/thresholds are associated with a particular merchant. In some examples, these thresholds can be associated with a specific merchant location (such as an individual store or a franchise location) or with a number of merchant locations (such as any franchise location, or any other group of related or unrelated businesses). In other examples, these thresholds can be associated with a specific customer members, a group of customer members, or all customer members. Based on this information, the one or more processors can determine whether one or more thresholds have been reached to trigger one or more reward redemptions or advertisement validations for the customer.

Based on the threshold reward or advertisement information, one or more processors can be configured to determine if the transaction data meets the reward/advertisement redemption criteria. In some examples, this can include determining with the transaction data whether the transaction occurred during a time period in which the reward or advertisement could be redeemed. For example, this could include limited time offers, offers for specific times of the day/week/month/season/year/etc. In some examples, this can include determining with the transaction data whether the transaction occurred during a time period in which cumulative totals for triggering rewards/advertisement could occur.

One or more processors can be configured, in some examples, to determine if the transaction would cause the member/customer to meet reward/advertisement threshold criteria. For individual transaction rewards/ads, the processor(s) can be configured to issue an event driven reward/ad redemption if it determines from the transaction data that the transaction was for an amount over the reward/ad threshold (e.g. a reward for a minimum $20 spend).

In an embodiment, the one or more processors can be configured to determine if the transaction would cause the member/customer to meet criteria for receiving a particular reward or offer. For example, when such criteria are met, the member/customer may be issued an appreciation reward. The appreciation reward may provide the member/customer with a discount or a gift. In some cases, the discount or gift may be redeemable by the customer upon their next visit/purchase at the particular merchant. In one specific example, the appreciation reward may be provided if the member/customer shops with a particular merchant three times, and be a 50% discount off the member/customer's next purchase from the particular merchant. When the transaction for that next purchase is received and processed at the loyalty system, the transaction may be processed in manners described above to determine that the relevant criteria have been met (e.g., that the customer has shopped at the particular merchant three times).

If rewards/advertisement triggered by cumulative thresholds are available, one or more processors can be configured to retrieve, determine or otherwise access a previous cumulative total for the customer, and increment/decrement the totals for a purchase/refund. Totals for customer member visits could be incremented or decremented by one for each purchase or refund transaction. Totals for cumulative member spend could be incremented or decremented by the transaction value. In some examples, these totals may be incremented/decremented by different factors for certain promotions such as double points days.

With the inclusion of the current transaction data, if the customer member meets a reward/ad threshold, an event driven reward/ad redemption is flagged and the associated cumulative total is reset.

This process can be repeated for each reward/ad available for the merchant/customer. In some examples, if multiple rewards/ads are triggered, multiple rewards/ads can be flagged.

FIG. 7 shows a flowchart illustrated an example method for confirming reward redemption/ad validation. For each of the flagged rewards/ads, the processor(s) can be configured to determine whether the customer activated the reward/ad. Activating the reward/ad can, in some examples, include providing an input to a mobile or online application displaying the reward/ad, scanning a barcode or other tag, or any other acknowledgement or acceptance of the reward/ad. In some examples, if the processor(s) determine that the reward/ad was not activated, the reward/ad is not redeemed.

In some examples, the processor(s) can be configured to determine whether the transaction data indicates the transaction was performed after the reward/ad was activated and/or the transaction was performed before an optional expiry period associated with the reward/ad. In some examples, the expiry period may be relative to the activation date, while in other examples, the expiry period may be an absolute date/time.

In some examples, the processor(s) can be configured to determine whether the reward was deactivated or deleted by the merchant, the loyalty system, an administrator or otherwise. In some examples, if the transaction was before the deactivation or deletion time, the reward/ad may still be redeemed. In some examples, the reward/ad may not be redeemed regardless of the timing of the deactivation/deletion.

In some examples, the processor(s) can be configured to determine if the reward/ad was already redeemed. In some examples, a reward/ad can be redeemed once, a specified number of times, or an unlimited number of times.

Upon satisfying any applicable criteria, the processor(s) can be configured for any rewards/ads associated with a charity donation to calculated a donation amount with the transaction data. In some examples, the calculated donation may be increased or decreased based on the redeemed reward/ad.

The processor(s) can be configured to save, link or otherwise indicate that the reward/ad has been redeemed.

As indicated, by example, in FIG. 7, the processor(s) can be configured to match the transaction data with the reward/ad most recently activated by the member for the particular merchant. However, other matching configurations may be applied. For example, as noted above, survey responses or signals received from a customer or merchant device may also be used to match rewards.

In some examples, the transaction data may be incorrectly matched to a reward/ad. This may occur, for example, when multiple transactions are conducted by a customer at the same merchant within a short period of time.

Figure 8:
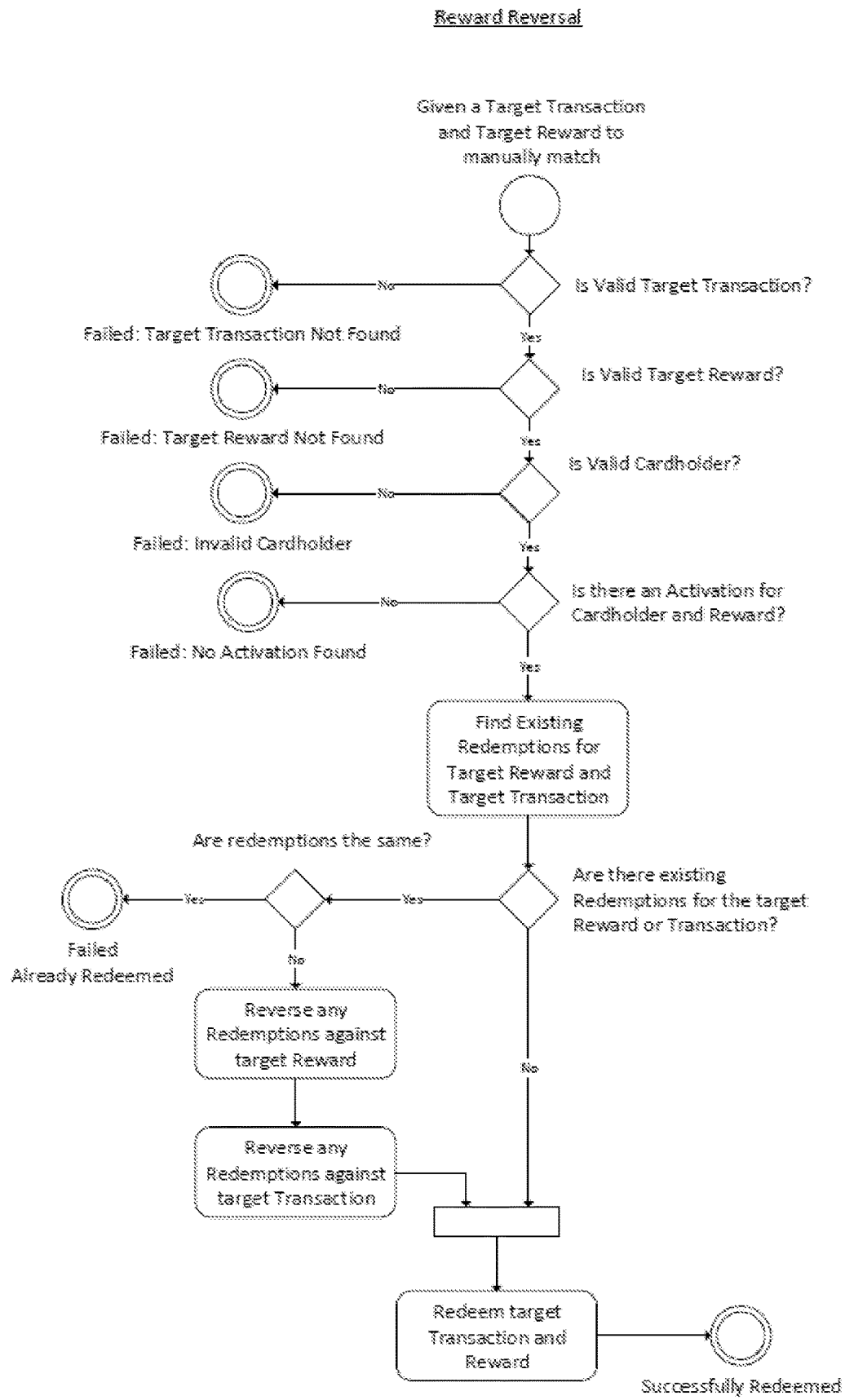

In some scenarios, the processor(s) can be configured to reverse an incorrect, duplicate or questionable reward/ad to transaction matching. FIG. 8 shows a flowchart of an example reward reversal. In some examples, as part of a manually or automatically triggered audit process or any other process, the processor(s) can be configured to receive target transaction and target reward data.

The processor(s) can be configured to verifying whether the target transaction, the target reward/ad, and the target cardholder are valid; and if the cardholder activated the target reward. If not, the processor(s) may be configured to end the audit process.

In some examples, the processor(s) can be configured to retrieve, request or otherwise access the existing redemptions for the target reward and transaction. If the target transaction is matched to a different reward, the processor(s) can be configured to reverse the match to the different reward. Similarly, if the target reward is matched to a different transaction, the processor(s) can be configured to reverse the match to the different transaction.

In some examples, reversing these matches can, when appropriate, include reversing or recalculating charity donations; reversing, updating or resending any pending or submitted surveys; revising any statistics or analytics associated with redemptions and donations; and/or revising or regenerating any member redemptions/rewards.

Upon reversing an incorrect or undesired matching, the processor(s) can be configured to apply the matching of the target transaction to the target reward in a similar manner as described herein or otherwise.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The invention claimed is:

1. A method comprising:
receiving transaction data associated with a transaction between a customer and merchant, wherein, the transaction data:
are exchanged via telecommunications hardware for the transaction between the customer and the merchant with a short range wireless network operating according to the 802.11 family of standards; and
includes:
transaction time information for the transaction
transaction amount for the transaction; and
customer survey response data received from the customer who conducted the transaction with the merchant;
determining from the transaction data whether the customer and the merchant are associated with a loyalty or advertising system by determining whether:
identifiers in the transaction data associated with the merchant and the customer correspond to identifiers in a database of registered loyalty or advertising identifiers;
the transaction was completed during operational hours for the merchant;
the transaction amount is greater than a threshold amount associated with a reward or an advertisement;
a cumulative transaction amount for all of the transaction amounts of the customer's said transactions with the merchant have a sum that is greater than a cumulative threshold amount associated with the reward or advertisement;
the time corresponding to the transaction time information for the transaction corresponds to a time that:
the reward or advertisement was activated; or
was before an expiry time associated with the reward or advertisement;
the reward or advertisement has already been redeemed by the customer;
and
information in the received customer survey response data corresponds to the reward or the advertisement;
and
upon determining from the transaction data whether the transaction corresponds to a reward or advertisement:
determining whether the transaction data has been previously received, and if so, discontinuing processing the transaction data;
and
otherwise, triggering the redemption of the reward or advertisement.

2. The method of claim 1, wherein the reward is a charity donation paid by the merchant to a charity that is calculated as a donation amount by using the transaction data.

3. The method of claim 1, wherein an identifier is associated with the customer and is the only information in the received transaction data for identifying the customer.

4. The method of claim 1, wherein the transaction data corresponds to the reward.

5. The method of claim 1, wherein the transaction data corresponds to the advertisement.

6. The method of claim 1, wherein the transaction data corresponds to both the reward and the advertisement.

7. A non-transitory, computer readable medium or media having stored thereon computer readable instructions which when executed by hardware configure the hardware to:
receive transaction data associated with a transaction between a customer and merchant, wherein, the transaction data:
are exchanged via telecommunications hardware for the transaction between the customer and the merchant with a short range wireless network operating according to the 802.11 family of standards; and includes:
 transaction time information for the transaction
 transaction amount for the transaction; and
 customer survey response data received from the customer who conducted the transaction with the merchant;
determine from the transaction data whether the customer and the merchant are associated with a loyalty or advertising system by determining whether:
 identifiers in the transaction data associated with the merchant and the customer correspond to identifiers in a database of registered loyalty or advertising identifiers;
 the transaction was completed during operational hours for the merchant;
 the transaction amount is greater than a threshold amount associated with a reward or an advertisement;
 a cumulative transaction amount for all of the transaction amounts of the customer's said transactions with the merchant have a sum that is greater than a cumulative threshold amount associated with the reward or advertisement;
 the time corresponding to the transaction time information for the transaction corresponds to a time that:
  the reward or advertisement was activated; or
  was before an expiry time associated with the reward or advertisement;
 the reward or advertisement has already been redeemed by the customer;
 and
 information in the received customer survey response data corresponds to the reward or the advertisement; and
upon a determination from the transaction data whether the transaction corresponds to a reward or advertisement:
 determine whether the transaction data has been previously received, and if so, discontinuing processing the transaction data;
 and
 otherwise, trigger the redemption of the reward or advertisement.

8. The non-transitory, computer readable medium or media of claim 7, wherein the reward is a charity donation paid by the merchant to a charity that is calculated as a donation amount by using the transaction data.

9. The non-transitory, computer readable medium or media of claim 7, wherein an identifier is associated with the customer and is the only information in the received transaction data for identifying the customer.

10. The non-transitory, computer readable medium or media of claim 7, wherein, transaction data corresponds to the reward.

11. The non-transitory, computer readable medium or media of claim 7, wherein the transaction data corresponds to the advertisement.

12. The non-transitory, computer readable medium or media of claim 7, wherein the computer readable instructions, when executed by the hardware configure the hardware to:
 discontinue, upon determining that the transaction data had been previously received, processing of the transaction data;
 and
 otherwise trigger the redemption of the reward or advertisement.

13. The non-transitory, computer readable medium or media of claim 7, wherein the computer readable instructions, when executed by the hardware, further configure the hardware to determine, upon a determination that the transaction data had been previously received, that the transaction data corresponds to a second reward or advertisement and if so, the generate signals to change:
 a first indicator to indicate that the reward or advertisement has not been redeemed; and
 a second indicator to indicate that a second reward or a second advertisement has been redeemed.

14. A system comprising hardware configured to:
receive transaction data associated with a transaction between a customer and merchant, wherein, the transaction data:
 are exchanged via telecommunications hardware for the transaction between the customer and the merchant with a short range wireless network operating according to the 802.11 family of standards; and
 includes:
  transaction time information for the transaction
  transaction amount for the transaction; and
  customer survey response data received from the customer who conducted the transaction with the merchant;
determine from the transaction data whether the customer and the merchant are associated with a loyalty or advertising system by determining whether:
 identifiers in the transaction data associated with the merchant and the customer correspond to identifiers in a database of registered loyalty or advertising identifiers;
 the transaction was completed during operational hours for the merchant;
 the transaction amount is greater than a threshold amount associated with a reward or an advertisement;
 a cumulative transaction amount for all of the transaction amounts of the customer's said transactions with the merchant have a sum that is greater than a cumulative threshold amount associated with the reward or advertisement;
 the time corresponding to the transaction time information for the transaction corresponds to a time that:
  the reward or advertisement was activated; or
  was before an expiry time associated with the reward or advertisement;
 the reward or advertisement has already been redeemed by the customer;
 and
 information in the received customer survey response data corresponds to the reward or the advertisement; and
upon a determination from the transaction data whether the transaction corresponds to a reward or advertisement:
 determine whether the transaction data has been previously received, and if so, discontinuing processing the transaction data;
 and
 otherwise, trigger the redemption of the reward or advertisement.

15. The system as defined in claim 14, wherein the reward is a charity donation paid by the merchant to a charity that is calculated as a donation amount by using the transaction data.

16. The system as defined in claim 14, wherein an identifier is associated with the customer and is the only information in the received transaction data for identifying the customer.

17. The system as defined in claim 14, wherein, transaction data corresponds to the reward.

18. The system as defined in claim 14, wherein the transaction data corresponds to the advertisement.

19. The system as defined in claim 14, further comprising:
discontinuing, upon determining that the transaction data had been previously received, processing of the transaction data;
and
otherwise triggering the redemption of the reward or advertisement.

20. The system as defined in claim 14, where in the hardware is further configured to:
determine, upon determining that the transaction data had been previously received, that the transaction data corresponds to a second reward or advertisement and if so then generate signals to change:
a first indicator to indicate that the reward or advertisement has not been redeemed; and
a second indicator to indicate that a second reward or a second advertisement has been redeemed.

* * * * *